United States Patent
Kubota et al.

(10) Patent No.: US 8,672,604 B2
(45) Date of Patent: Mar. 18, 2014

(54) INDUSTRIAL ROBOT

(75) Inventors: Taizo Kubota, Fukuoka (JP); Kentaro Tanaka, Fukuoka (JP); Osamu Harada, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 480 days.

(21) Appl. No.: 13/045,527

(22) Filed: Mar. 11, 2011

(65) Prior Publication Data

US 2011/0222999 A1 Sep. 15, 2011

(30) Foreign Application Priority Data

Mar. 12, 2010 (JP) ................................. 2010-056136

(51) Int. Cl.
*B25J 9/06* (2006.01)

(52) U.S. Cl.
USPC .......... 414/744.3; 414/744.5; 74/526; 901/11

(58) Field of Classification Search
USPC ........... 414/744.3, 744.4, 744.5, 918; 901/11, 901/12; 74/490.01, 490.04, 526
See application file for complete search history.

(56) References Cited

U.S. PATENT DOCUMENTS

| | | | | |
|---|---|---|---|---|
| 4,767,257 A | * | 8/1988 | Kato | 414/744.5 |
| 4,934,504 A | * | 6/1990 | Torii et al. | 192/139 |
| 5,193,658 A | * | 3/1993 | Tellden | 192/138 |
| 6,065,364 A | | 5/2000 | Shiraki et al. | |
| 7,086,822 B2 | * | 8/2006 | Maeda | 414/744.5 |
| 2009/0126598 A1 | | 5/2009 | Takeda | |

FOREIGN PATENT DOCUMENTS

| | | |
|---|---|---|
| JP | 4-240089 | 8/1992 |
| JP | 10-156786 | 6/1998 |
| JP | 2000-000792 | 1/2000 |
| JP | 2003-205488 | 7/2003 |
| JP | 4168410 B2 | 1/2008 |
| JP | 2009-119566 | 6/2009 |
| WO | WO 2008/023560 | 2/2008 |

OTHER PUBLICATIONS

Japanese Office Action for corresponding JP Application No. 2010-167422, Mar. 13, 2012.
Extended European Search Report for corresponding EP Application No. 11157741.7-2316, May 30, 2011.
Notification of Reason(s) for Rejection for Corresponding Japanese Application No. JP2010-056136, Jun. 8, 2010.

* cited by examiner

*Primary Examiner* — Dean Kramer
(74) *Attorney, Agent, or Firm* — Ditthavong Mori & Steiner, P.C.

(57) ABSTRACT

An industrial robot includes a hand on which a workpiece is placed, an arm that takes out the hand from a predetermined position of the workpiece and supplies the hand, an up-down moving mechanism connected to the arm by a support member, a pedestal provided at a lower portion of the up-down moving mechanism, and a pendulum stopper provided on a base on which the pedestal turns.

17 Claims, 5 Drawing Sheets

Turning motion direction of robot

INDUSTRIAL ROBOT

CROSS-REFERENCE TO RELATED APPLICATION

The present application claims priority under 35 U.S.C. §119 to Japanese Patent Application No. 2010-056136 filed Mar. 12, 2010. The contents of this application are incorporated herein by reference in their entirety.

BACKGROUND OF THE INVENTION

1. Field of the Invention

The present invention relates to an industrial robot that carries a workpiece.

2. Description of the Related Art

Industrial robots have been proposed, and the present applicant has developed an industrial robot disclosed in Japanese Patent No. 4168410.

Since such an industrial robot is used in the clean room, it operates while being set between apparatuses and stockers. Hence, the industrial robot tends to extremely dislike particulate generation.

In recent years, there is an increasing demand to shorten the workpiece carrying time, that is, the cycle time for higher productivity. For that purpose, the operation speed of the industrial robot has been increased while the operation sequence has been optimized.

SUMMARY OF THE INVENTION

An industrial robot according to one aspect of the present invention includes a hand on which a workpiece is placed; an arm that takes out the hand from a predetermined position of the workpiece and supplies the hand; an up-down moving mechanism connected to the arm by a support member; a pedestal provided at a lower portion of the up-down moving mechanism; and a pendulum stopper provided on a base on which the pedestal turns.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
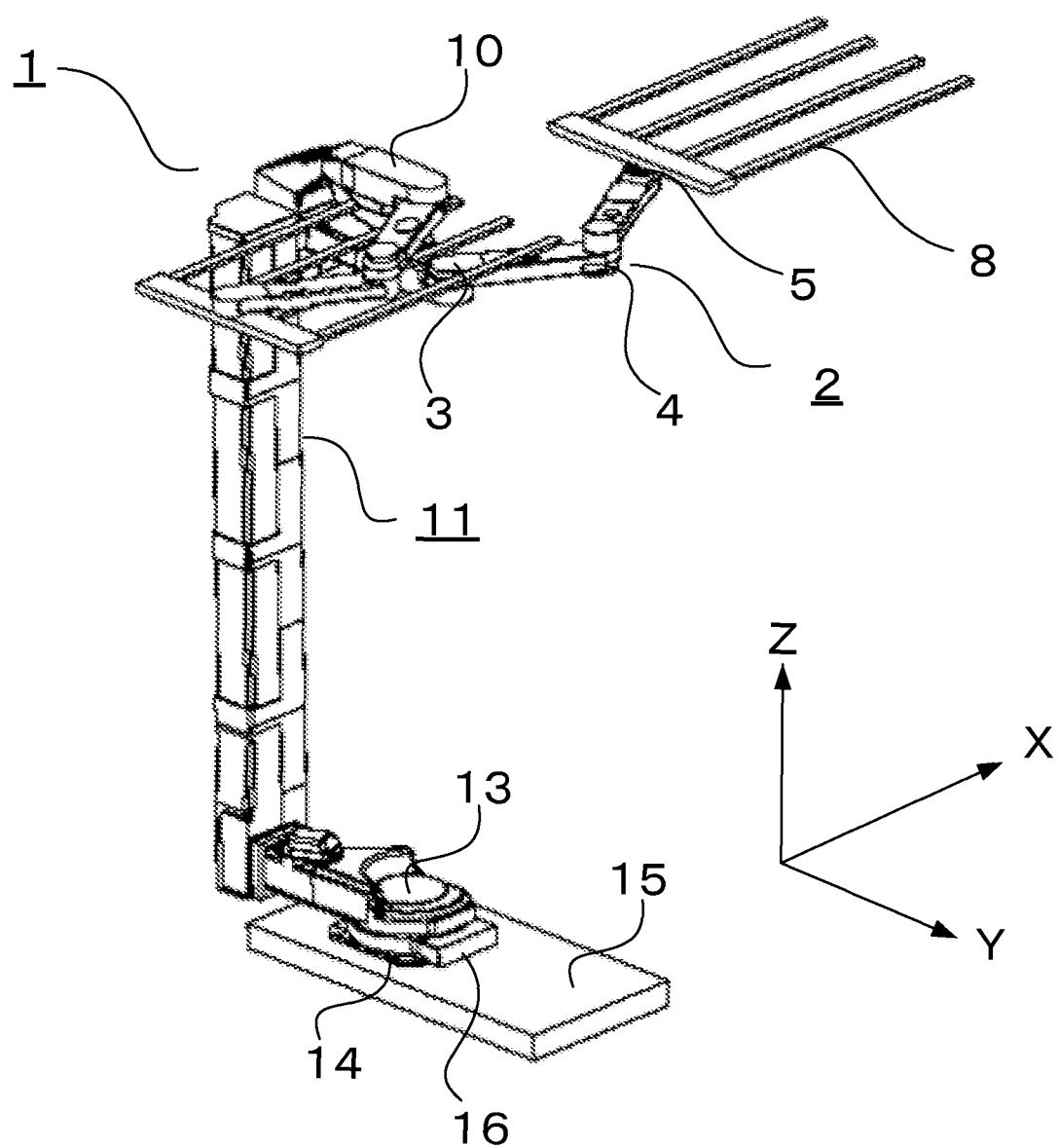
FIG. 1 is a perspective view of an industrial robot according to an embodiment of the present invention.

Embodiments will now be described with reference to the accompanying drawings, wherein like reference numerals designate corresponding or identical elements throughout the various drawings.

As illustrated in FIG. 1, an industrial robot 1 according to an embodiment includes two arms 2. Each arm 2 is turnably provided with rotary joints 3, 4, and 5. The arm 2 transmits rotational force from a rotary drive source so as to perform a desired action. A hand 8 of the arm 2 that holds a workpiece can rectilinearly move in a workpiece take-out and supply direction shown by arrow X in FIG. 1.

The industrial robot 1 also includes an up-down moving member 11 that moves a support member 10, to which the arm 2 is attached, in an up-down direction (Z-direction in FIG. 1) so as to adjust the up-down position of the arm 2. A pedestal 13 of the up-down moving member 11 is turnable such as to turn the industrial robot 1. The pedestal 13 is provided on a base 14, and the base 14 is provided on a moving carriage 15.

Figure 2:
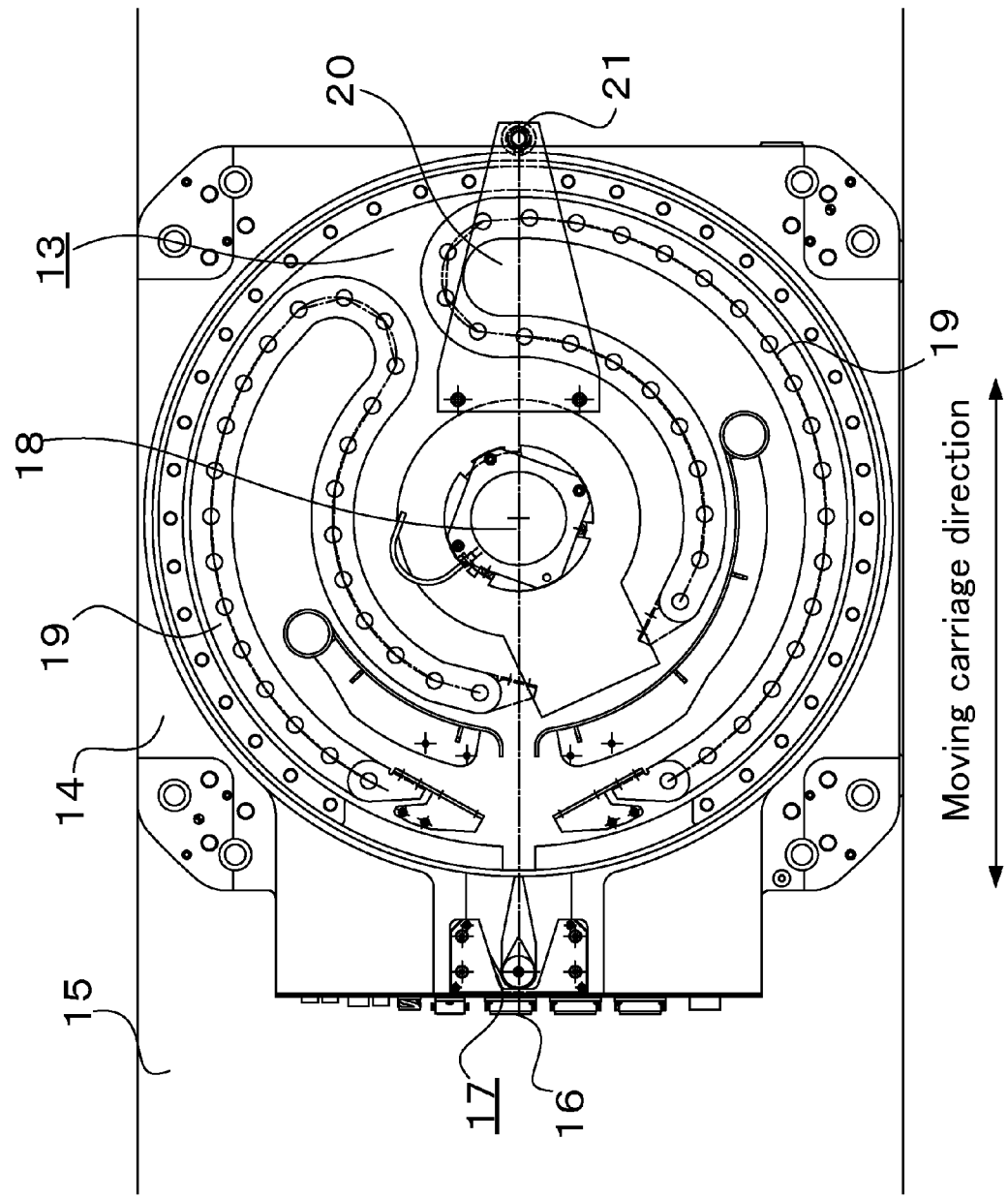
FIG. 2 is a top view of a base in the embodiment.

As illustrated in FIG. 2, a connector 16 is provided on the base 14 in the same direction as the moving direction of the moving carriage 15. Further, a pendulum stopper 17 is provided on an upper surface of the base 14 and on an upper side of the connector 16 such that the center of amplitude of the pendulum stopper 17 coincides with a turn center 18 on an axis extending in the moving direction of the moving carriage 15. This absorbs the thickness of the pendulum stopper 17, and allows the pedestal 13 to turn about ±181.5 degrees. That is, the initial setting position of the industrial robot 1 is determined by the positional relationship among the connector 16, the pendulum stopper 17, and the turn center 18. Further, when the connector 16 is provided in the same direction as the moving direction of the moving carriage 15 so that the pendulum stopper 17 operates symmetrically with respect to the axis extending in the moving direction of the moving carriage 15 and passing through the turn center 18, the length of cableveyors 19 in the base 14 is such that the pedestal 13 turns ±180.5 degrees, and the cableveyors 19 are symmetrically arranged. This arrangement is the most suitable for the cableveyors 19. Since the arrangement of the cableveyors 19 differs according to the position of a motor and the number of connectors, it is not limited particularly.

It is satisfactory as long as the pendulum stopper 17 is provided on the base 14 and on the axis extending in the moving direction of the moving carriage 15 and passing through the turn center 18. Hence, the pendulum stopper 17 may be provided on a side opposite the connector 16, instead of being provided on the upper side of the connector 16.

In the embodiment, the industrial robot 1 is provided on the moving carriage 15. When the moving carriage 15 is not provided, the connector 16 is provided in a direction orthogonal to the up-down moving direction Z of the hand 8 and the workpiece take-out and supply direction X in an initial setting state of the industrial robot 1. It is satisfactory as long as the pendulum stopper 17 operates symmetrically with respect to the direction that passes through the upper side of the connector 16 or the turn center 18 and that is orthogonal to the workpiece take-out and supply direction X.

On the pedestal 13, a cylindrical stopper 21 is provided at the tip of an arm 20. When the pedestal 13 turns, the cylindrical stopper 21 comes into contact with the pendulum stopper 17 so as to regulate the turning motion.

The turn angle of the pedestal 13 in the industrial robot 1 is monitored by a controller (not illustrated). The pedestal 13 decelerates and stops when the position of the pedestal 13 detected by an encoder provided in the pedestal 13 reaches a command position (180 degrees). The cylindrical stopper 21 contacts the pendulum stopper 17 by an amount corresponding to the radius thereof.

Figure 3:
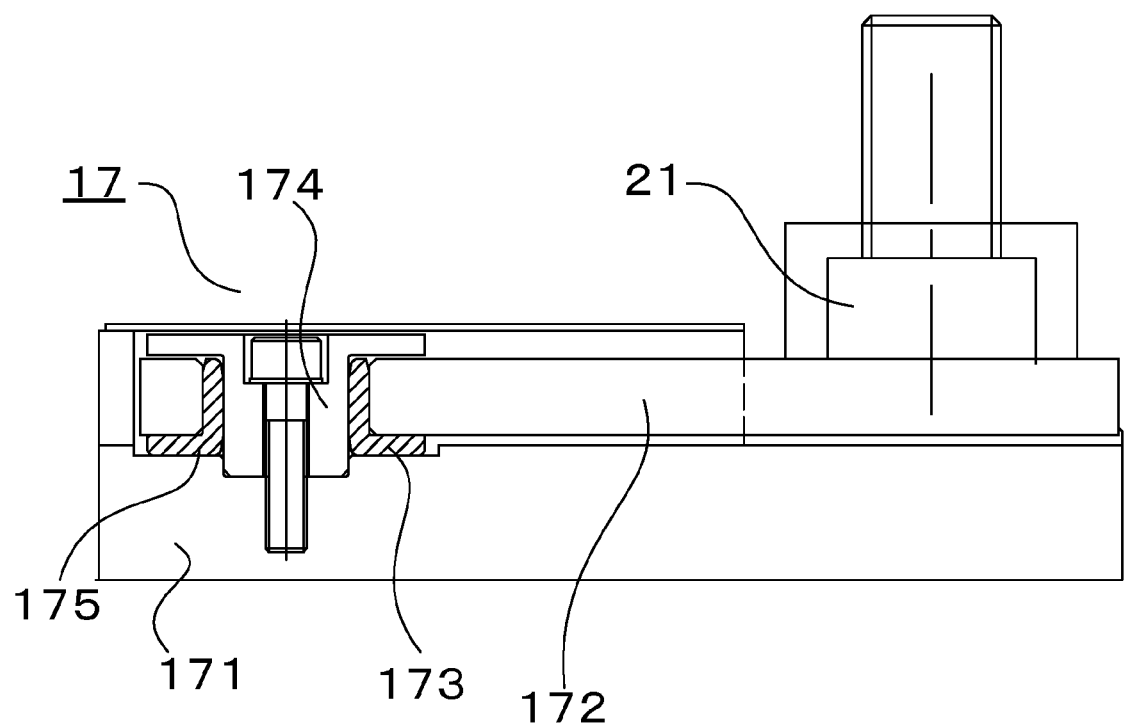
FIG. 3 is a sectional side view of a pendulum stopper in the embodiment.

Next, details of the pendulum stopper 17 will be described with reference to FIG. 3. The pendulum stopper 17 includes a base portion 171, a pendulum 172, a support portion 173, and a fixed portion 174. The base portion 171 is inclined to follow the shape of the pendulum 172, and highly abrasion-resistant urethane serving as an abrasion-resistant material is set on a portion of the base portion 171 in contact with the pendulum 172. Similarly, highly abrasion-resistant urethane is set on both side surfaces of the pendulum 172, and contacts the cylindrical stopper 21 provided at the tip of the arm 20 extending from the pedestal 13. The cylindrical stopper 21 is also formed of highly abrasion-resistant urethane serving as the abrasion-resistant material. The pendulum 172 is turnably supported by the sleeve (support portion) 173 formed of highly abrasion-resistant urethane serving as the abrasion-resistant material. The sleeve 173 can freely move to some extent because it is spaced apart from the fixed portion 174 fastened to the base 14. The support portion 173 has a collar 175 that supports the pendulum 172 in the gravitational direction.

While the support portion 173 is formed by a sleeve of a plain bearing in the embodiment, a general rolling bearing can be used alternatively.

While highly abrasion-resistant urethane is given as an example of an abrasion-resistant material, other materials, for example, fluorine resin and polymer material, such as polyurethane or polyoxymethylene, can be used.

In this structure, a contact portion between the pendulum 172 and the base portion 171 and a contact portion between the pendulum 172 and the cylindrical stopper 21 are formed of highly abrasion-resistant urethane serving as the abrasion-resistant material. This reduces particulate generation even during use in a clean room. Moreover, the contact area between the cylindrical stopper 21 and the pendulum 172 is small because of the cylindrical shape of the cylindrical stopper 21. This further reduces particulate generation.

Figure 4:
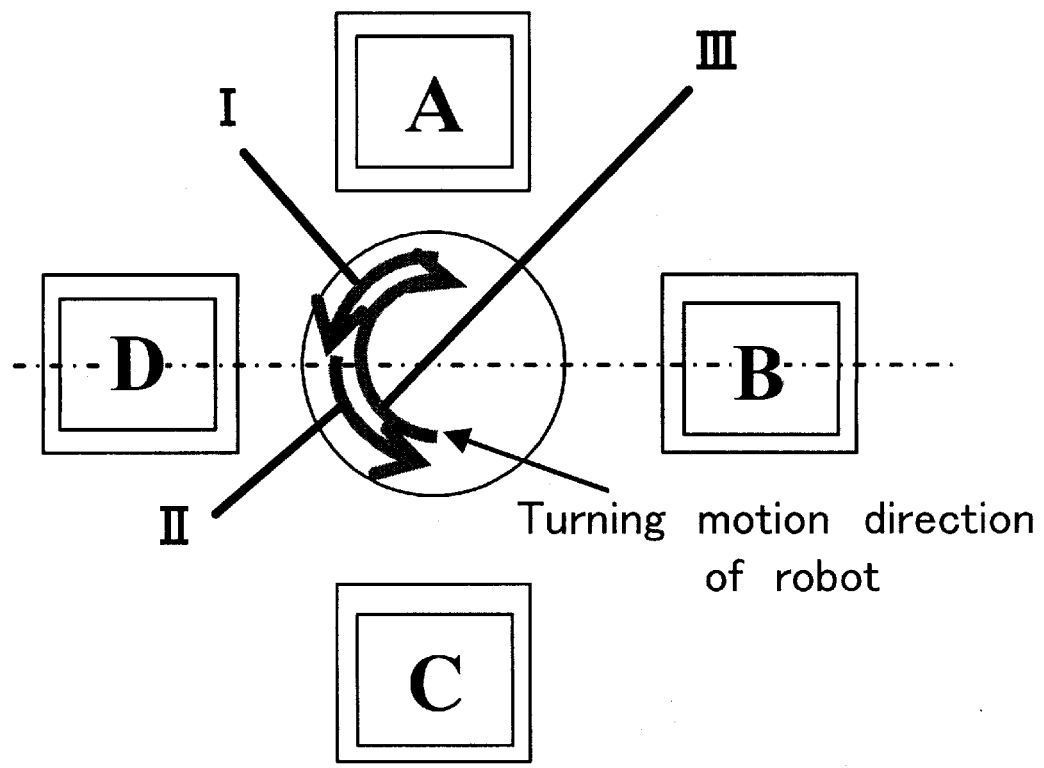
FIG. 4 illustrates an operation sequence of the industrial robot of the embodiment.
Figure 5:
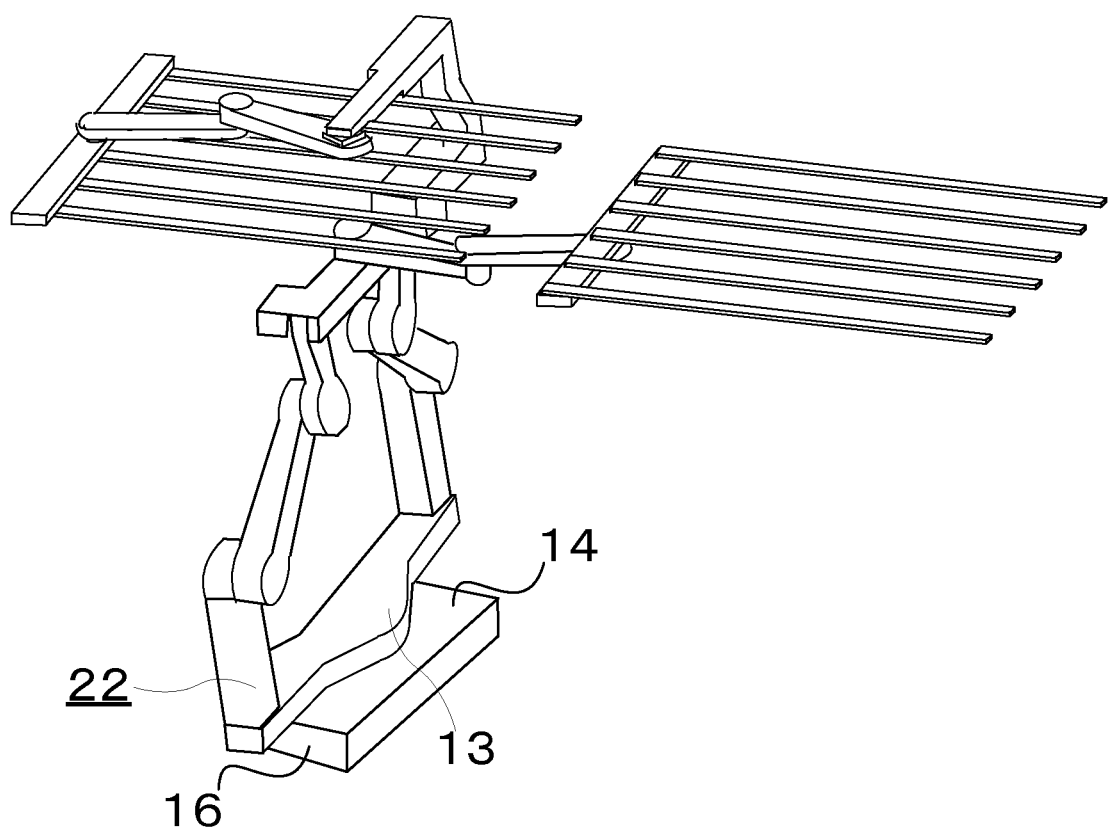
FIG. 5 is a perspective view of an industrial robot according to another embodiment of the present invention.

Next, operation will be described with reference to FIG. 4. In an example of an operation sequence, a workpiece is carried to positions A, D, C, and A in this order. The industrial robot 1 turns 90 degrees counterclockwise from the position A to the position D so as to carry an unillustrated workpiece in and out, turns 90 degrees counterclockwise from the position D to the position C (turns 180 degrees from the position A) so as to carry the workpiece in and out, and then turns 180 degrees clockwise from the position C to the position A, so that a series of operations are completed. That is, the turn angle is 360 degrees in this case. In general, the turn angle in FIG. 5 is 540 degrees. Thus, the difference in turn angle is 180 degrees. In terms of moving time, the cycle time can be shortened by two seconds.

In this way, the connector is provided in the same direction as the moving direction of the moving carriage, and the pendulum stopper is provided on the axis passing through the turn center and extending in the moving direction of the moving carriage. Hence, the blind area in the turn angle can be eliminated, and the cycle time is reduced.

Since the contact portions of the pendulum stopper are formed of the abrasion-resistant material, low particulate generation is achieved, and the use in the clean room is permitted.

The above-described preferred embodiment is just exemplary, and various modifications are possible without departing from the scope of the present invention.

While the up-down moving mechanism is provided on the sides of the arms in the above embodiment, the present invention is also applicable to a link type robot illustrated in FIG. 5, in which up-down movement is allowed by a link mechanism 22 having a pedestal 13 on a base 14. That is, the present invention is applicable to any industrial robot including such a mechanism that turns the industrial robot.

What is claimed as new and is desired to be secured by Letters Patent of the United States is:

1. An industrial robot comprising:
   a hand on which a workpiece is placed;
   an arm that is provided with a rotatable rotary joint;
   an up-down moving mechanism connected to the arm by a support member;
   a pedestal provided at a lower portion of the up-down moving mechanism, the pedestal including a stopper arm having a stopper provided at a tip end of the stopper arm;
   a base configured to rotatably support the pedestal about a center axis;
   a carriage configured to support the base and configured to move in a moving direction; and
   a pendulum stopper provided on the base, the pendulum stopper includes a pendulum configured to contact the stopper to regulate rotation of the pedestal on the base,
   wherein the pendulum is configured to pivot about a swing axis that is parallel to the center axis, and wherein the swing axis and the center axis are aligned along the moving direction of the carriage.

2. The industrial robot according to claim 1, wherein the pendulum stopper is provided on an upper surface of the base such as to swing with respect to an axis orthogonal to a moving direction of the hand and a moving direction of the support member.

3. The industrial robot according to claim 1, wherein the pendulum stopper is provided on an upper surface of the base such as to operate symmetrically with respect to an axis orthogonal to a moving direction of the hand and a moving direction of the support member.

4. The industrial robot according to claim 1, wherein the pendulum stopper is provided on an upper surface of the base.

5. The industrial robot according to claim 1, wherein the pendulum stopper is provided on an upper surface of the base such as to operate symmetrically with respect to an axis extending in the moving direction of the carriage, and passing through the center axis of the pedestal.

6. The industrial robot according to claim 1, wherein a connector is provided on a lower side face of the pendulum stopper, and cableveyors separately provided in the base are equal in length.

7. The industrial robot according to claim 1, wherein a connector is provided on a lower side face of the pendulum stopper, and a first cableveyor separately provided in the base is longer than a second cableveyor.

8. The industrial robot according to claim 1, wherein the pendulum stopper includes a base portion, the pendulum, a support portion, and a fixed portion.

9. The industrial robot according to claim 8, wherein the base portion is in contact with the pendulum with an abrasion-resistant material being disposed therebetween and follows a shape of the pendulum.

10. The industrial robot according to claim 9, wherein the abrasion-resistant material is a fluorine resin material or a polymer material.

11. The industrial robot according to claim 8, wherein the support portion is formed by a sleeve made of an abrasion-resistant material, and supports the pendulum in a turning direction and a gravitational direction.

12. The industrial robot according to claim 11, wherein the abrasion-resistant material is a fluorine resin material or a polymer material.

13. The industrial robot according to claim 1,
   wherein the hand is connected to a first end of the arm,
   wherein a second end of the arm is rotatably attached to the support member,
   wherein the arm includes an elbow joint located between the first end of the arm and the second end of the arm, wherein the arm is configured to extend and retract the hand along a first axis, and wherein the arm is configured such that, when the hand is moved along the first axis, the elbow joint protrudes outward in a direction orthogonal to the first axis.

14. The industrial robot according to claim 13, wherein the support member is attached to the up-down moving mechanism which is configured with a link or a column enabling an up-down movement in an up-down moving direction, and wherein the first axis is orthogonal to the up-down moving direction of the up-down moving mechanism.

15. The industrial robot according to claim 14, wherein the stopper decelerates and stops by a turning motion of the pedestal, contacting the pendulum which is swingably arranged on an upper surface of the base provided on a lower portion of the pedestal, and wherein the pendulum swings about the swing axis to contact a side surface of a base portion provided on the base.

16. The industrial robot according to claim 15, wherein an abrasion-resistant material is provided on a surface where the pendulum is configured to contact with the base portion.

17. The industrial robot according to claim 16, wherein a connector is provided on a lower side face of the pendulum stopper, wherein a first cableveyor and a second cableveyor are separately provided in the base and are connected to the connector, and wherein the first cableveyor is longer than the second cableveyor.

* * * * *